US012602516B2

(12) United States Patent
Bhargava et al.

(10) Patent No.: US 12,602,516 B2
(45) Date of Patent: Apr. 14, 2026

(54) IMPLEMENTING USER-SPECIFIC LOCAL ADMINISTRATOR RIGHTS USING ARTIFICIAL INTELLIGENCE TECHNIQUES

(71) Applicant: Dell Products L.P., Round Rock, TX (US)

(72) Inventors: Vivek Bhargava, Bangalore (IN); Furkan Mohd Nisar, Ambedkar Nagar (IN); Mayank Kapoor, Bangalore (IN); Dinesh Koppada, Bengaluru (IN)

(73) Assignee: Dell Products, L.P., Round Rock, TX (US)

( * ) Notice: Subject to any disclaimer, the term of this patent is extended or adjusted under 35 U.S.C. 154(b) by 111 days.

(21) Appl. No.: 18/589,931

(22) Filed: Feb. 28, 2024

(65) Prior Publication Data

US 2025/0272440 A1      Aug. 28, 2025

(51) Int. Cl.
*G06F 21/62* (2013.01)
*G06F 40/30* (2020.01)

(52) U.S. Cl.
CPC ............ *G06F 21/629* (2013.01); *G06F 40/30* (2020.01)

(58) Field of Classification Search
CPC .............................. G06F 21/629; G06F 40/30
USPC .......................................................... 726/27
See application file for complete search history.

(56) References Cited

U.S. PATENT DOCUMENTS 8,819,771 B2      8/2014  Biazetti et al.
11,831,729 B2    11/2023  Herzog et al.

| | | | | |
|---|---|---|---|---|
| 12,288,271 | B1 * | 4/2025 | Labrecque | .............. H04L 63/10 |
| 2005/0257244 | A1 | 11/2005 | Joly et al. | |
| 2007/0186102 | A1 * | 8/2007 | Ng | ....................... G06F 21/6227 |
| | | | | 713/165 |
| 2007/0214494 | A1 * | 9/2007 | Uruta | .................... G06F 21/608 |
| | | | | 726/2 |
| 2008/0022368 | A1 * | 1/2008 | Field | ..................... H04L 63/102 |
| | | | | 726/4 |
| 2008/0120686 | A1 | 5/2008 | Gao et al. | |
| 2010/0054433 | A1 * | 3/2010 | Gustave | ................ H04M 3/533 |
| | | | | 379/88.23 |
| 2011/0126192 | A1 * | 5/2011 | Frost | ......................... G06F 8/61 |
| | | | | 717/178 |
| 2014/0059651 | A1 * | 2/2014 | Luster | ................... G06F 21/604 |
| | | | | 726/4 |
| 2017/0214695 | A1 * | 7/2017 | Chachar | .................... G06F 3/14 |
| 2018/0337906 | A1 * | 11/2018 | Spektor | .................. G06F 21/33 |
| 2019/0073385 | A1 * | 3/2019 | Zhang | ................. G06F 16/9554 |

(Continued)

FOREIGN PATENT DOCUMENTS

EP            1927929 A1      6/2008

*Primary Examiner* — David P Zarka
(74) *Attorney, Agent, or Firm* — Ryan, Mason & Lewis, LLP

(57) ABSTRACT

An example computer-implemented method provided herein includes obtaining data pertaining to at least one request for local administrator rights (LAR) from a given user; determining one or more recommendations related to the at least one request for LAR by processing at least a portion of the obtained data using one or more artificial intelligence techniques; modifying at least a portion of the LAR associated with the at least one request to encompass at least a portion of the one or more recommendations; and automatically implementing the modified LAR with respect to one or more devices associated with the given user.

20 Claims, 10 Drawing Sheets

(56)         References Cited

U.S. PATENT DOCUMENTS

| | | | |
|---|---|---|---|
| 2020/0128018 A1* | 4/2020 | Kumaraswamy | H04L 63/108 |
| 2020/0267006 A1* | 8/2020 | Nyman | H04L 63/062 |
| 2021/0258208 A1* | 8/2021 | Sharma | H04L 41/0895 |
| 2022/0276859 A1* | 9/2022 | Brevoort | G06F 8/60 |
| 2023/0379324 A1* | 11/2023 | Gillis | H04L 63/0861 |
| 2024/0129341 A1* | 4/2024 | Badana | H04L 63/104 |
| 2024/0137372 A1 | 4/2024 | Leung et al. | |
| 2024/0144049 A1* | 5/2024 | Cheng | G06F 16/3329 |
| 2024/0144676 A1* | 5/2024 | Arroyo | G06V 10/82 |
| 2024/0362349 A1 | 10/2024 | Babani | |
| 2025/0103795 A1* | 3/2025 | Santra | G06N 3/09 |
| 2025/0125041 A1* | 4/2025 | Zoldan | G06Q 30/018 |
| 2025/0258948 A1* | 8/2025 | Bhargava | G06F 21/6218 |

* cited by examiner

DATA OUTPUT   EXPLAIN   MESSAGES   QUERY HISTORY

|   | badge text | classification text | jobtitle | jobfunction | jobfamily |
|---|---|---|---|---|---|
| 1 | XXXXXXX | Employee | Senior Director, Software | Engineering Research & Development | Software Engineering |
| 2 | XXXXXXX | Employee | Software Senior Principal | Engineering Research & Development | Software Engineering |
| 3 | XXXXXXX | Employee | Advisor, Marketing | Marketing | Marketing Comms |
| 4 | XXXXXXX | Employee | Senior Advisor, Product | Engineering Research & Development | Product Management |
| 5 | XXXXXXX | Employee | Account Executive | Outside Sales | Direct Sales |

DATA OUTPUT   EXPLAIN   MESSAGES   QUERY HISTORY

|   | product | version | manufacturer | MSI text | soft_full_name | release_licensable |
|---|---|---|---|---|---|---|
| 1 | Battery Management | 1.2.3.4.5_BuildX | Company X | NonMSI | Battery Management | yes |
| 2 | Microsoft .NET | 1.2.34.56789 | Microsoft | NonMSI | .NET .NET SDR | yes |
| 3 | Git versionX | X.11.1 | Git Project | NonMSI | Git | no |
| 4 | Exchanger | 1.2.3 | CompanyZ | NonMSI | PROGRAM-X | yes |
| 5 | CoreUtils | Y.1 | CompanyW | NonMSI | Coreutils | no |

*FIG. 2A cont.*

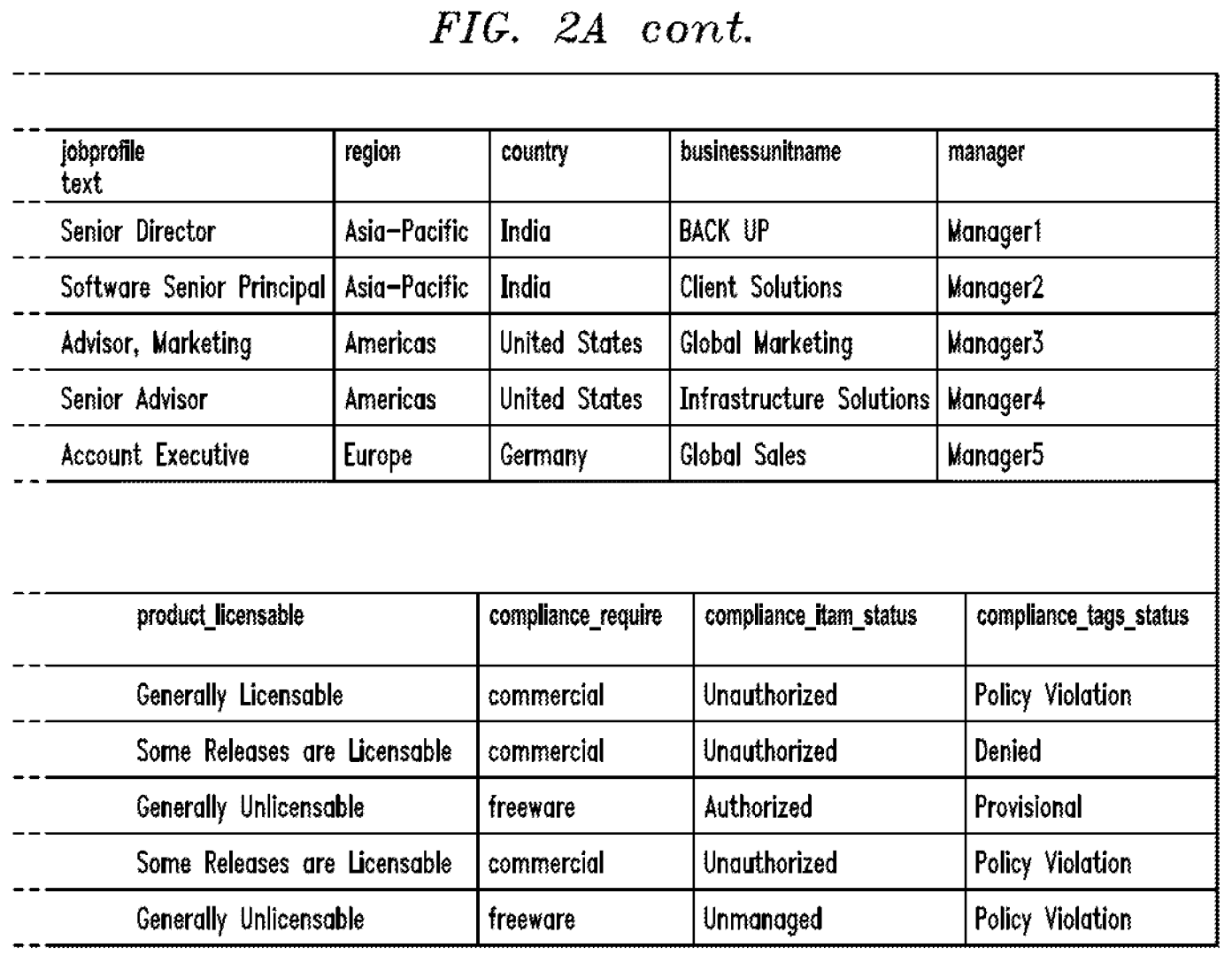

| jobprofile text | region | country | businessunitname | manager |
|---|---|---|---|---|
| Senior Director | Asia-Pacific | India | BACK UP | Manager1 |
| Software Senior Principal | Asia-Pacific | India | Client Solutions | Manager2 |
| Advisor, Marketing | Americas | United States | Global Marketing | Manager3 |
| Senior Advisor | Americas | United States | Infrastructure Solutions | Manager4 |
| Account Executive | Europe | Germany | Global Sales | Manager5 |

| product_licensable | compliance_require | compliance_item_status | compliance_tags_status |
|---|---|---|---|
| Generally Licensable | commercial | Unauthorized | Policy Violation |
| Some Releases are Licensable | commercial | Unauthorized | Denied |
| Generally Unlicensable | freeware | Authorized | Provisional |
| Some Releases are Licensable | commercial | Unauthorized | Policy Violation |
| Generally Unlicensable | freeware | Unmanaged | Policy Violation |

| | HOST_ID | CAT_SOFTWARE_FULLNAME |
|---|---|---|
| 0 | X00000002 | Program-1 |
| 1 | X00000010 | Program-2 |
| 2 | X00000011 | Program-3 |
| 3 | X00000013 | Program-4 |
| 4 | X00000014 | Program-5 |
| ... | ... | ... |
| 1741 | X00963703 | Program-6 |
| 1742 | X00963709 | Program-7 |
| 1743 | X00963716 | Program-8 |
| 1744 | X00963730 | Program-9 |
| 1745 | X00963731 | Program-10 |

| CAT_SOFTWARE_FULLNAME | | CAT_TAXONOMY_CATEGORY1 | CAT_TAXONOMY_CATEGORY2 | CAT_TAXONOMY_CATEGORY3 | DONOTUSE_VENDOR_CATEGORY |
|---|---|---|---|---|---|
| diffutils | - | Content Authoring & Consumption | Productivity | Word Processors | Productivity |
| pycairo | - | Tools and Utilities | Software Development | Application Architecture and Design | Multimedia & Graphics |
| diffutils | - | Content Authoring & Consumption | Productivity | Word Processors | Productivity |
| SharePoint SharePoint Server | - | Business Applications | Collaboration | Collaboration Platforms | Enterprise Content Management |
| Java Development Kit (JDK) Standard | - | Tools and Utilities | Software Development | Application Architecture and Design | Middleware |

| BUSINESS_UNIT_NAME | JOB_TITLE | JOB_FAMILY_GROUP | JOB_FAMILY | SUPERVISORY_ORGANIZATION_NAME | WORK_COUNTRY_CODE |
|---|---|---|---|---|---|
| Digital | Senior Manager, Software Engineer IT | Information Technology | Software Engineer-IT | Information Exchange-ICDS | IN |
| Digital | Senior Manager, Software Engineer IT | Information Technology | Software Engineer-IT | Information Exchange-ICDS | IN |
| Digital | Senior Manager, Software Engineer IT | Information Technology | Software Engineer-IT | EIS-BIE-ProductCOE-L30ps | US |
| Digital | Senior Principal, Software Engineer IT | Information Technology | Software Engineer-IT | IT Network Development | IN |
| Digital | Senior Manager, Software Engineer IT | Information Technology | Software Engineer-IT | EIS-BIE-ProductCOE-L30ps | IN |

COSINE SIMILARITY BETWEEN SOFTWARE COMPONENTS

|  | 0 | 1 | 2 | 3 | 4 | 5 | 6 | 7 | 8 | 9 | ... |
|---|---|---|---|---|---|---|---|---|---|---|---|
| 0 | 1.000000 | 0.600099 | 0.648181 | 0.711512 | 0.603023 | 0.625000 | 0.516185 | 0.410997 | 0.530330 | 0.624038 | ... |
| 1 | 0.600099 | 1.000000 | 0.565779 | 0.621059 | 0.526361 | 0.600099 | 0.500626 | 0.322873 | 0.668648 | 0.544705 | ... |
| 2 | 0.648181 | 0.565779 | 1.000000 | 0.596285 | 0.568535 | 0.766032 | 0.486664 | 0.426241 | 0.555556 | 0.784465 | ... |
| 3 | 0.711512 | 0.621059 | 0.596285 | 1.000000 | 0.762770 | 0.790569 | 0.580381 | 0.259938 | 0.521749 | 0.613941 | ... |
| 4 | 0.603023 | 0.526361 | 0.568535 | 0.762770 | 1.000000 | 0.678401 | 0.622543 | 0.297409 | 0.497468 | 0.585369 | ... |
| ... | ... | ... | ... | ... | ... | ... | ... | ... | ... | ... | ... |
| 1741 | 0.150756 | 0.131590 | 0.071067 | 0.095346 | 0.090909 | 0.150756 | 0.345857 | 0.049568 | 0.071067 | 0.083624 | ... |
| 1742 | 0.267261 | 0.291606 | 0.314970 | 0.169031 | 0.161165 | 0.267261 | 0.367884 | 0.175750 | 0.251976 | 0.370625 | ... |
| 1743 | 0.035714 | 0.031174 | 0.033672 | 0.045175 | 0.043073 | 0.035714 | 0.032774 | 0.046971 | 0.033672 | 0.039621 | ... |
| 1744 | 0.158114 | 0.207020 | 0.223607 | 0.300000 | 0.286039 | 0.316228 | 0.290191 | 0.103975 | 0.223607 | 0.175412 | ... |
| 1745 | 0.288675 | 0.251976 | 0.272166 | 0.273861 | 0.261116 | 0.360844 | 0.397360 | 0.142374 | 0.272166 | 0.240192 | ... |

|  | ID | MOST SIMILAR ID | SIMILAR SCORE |
|---|---|---|---|
| 0 | X00000002.0 | X00104463.0 | 0.832050 |
| 1 | X00000002.0 | X00000453.0 | 0.788241 |
| 2 | X00000010.0 | X00021111.0 | 0.763763 |
| 3 | X00000010.0 | X00107525.0 | 0.763763 |
| 4 | X00000011.0 | X00000327.0 | 0.784465 |
| ... | ... | ... | ... |
| 3487 | X00963716 | X00016667 | 0.701415 |
| 3488 | X00963730 | X00682857 | 0.596285 |
| 3489 | X00963730 | X00130408 | 0.580381 |

```
from sklearn.feature_extraction.text import CountVectorizer def custom_tokenizer(line):
    return(line.split())

vectorizer = CountVectorizer(binary=True, tokenizer=custom_tokenizer)
vectorizer = vectorizer.fit(all_sw)

dtm = vectorizer.transform(merged_df['CAT_SOFTWARE_FULLNAME'].str.lower())
dtm def get_similar_emps(n):
    """
    Creates a dataframe containing the n most similar employees to each employee.
    """
    sims = pd.DataFrame(columns = ['id', 'most similar id', 'similarity score'])

cur_length = 0 # keep track of num rows in the df
    for i in range(len(sim_matrix)):

host_id = merged_df['HOST_ID'][i] # get corresponding index
        similar_ids = sim_matrix.iloc[i].nlargest(n+1)[1:] # get i most similar emps for index, score in similar_ids.items(): # iterate through, appending one emp per row
            sim_id = merged_df['HOST_ID'][index]
            sims.loc[cur_length] = [host_id, sim_id, score]
            cur_length += 1 return sims get_similar_emps(2)
```

*FIG. 5*

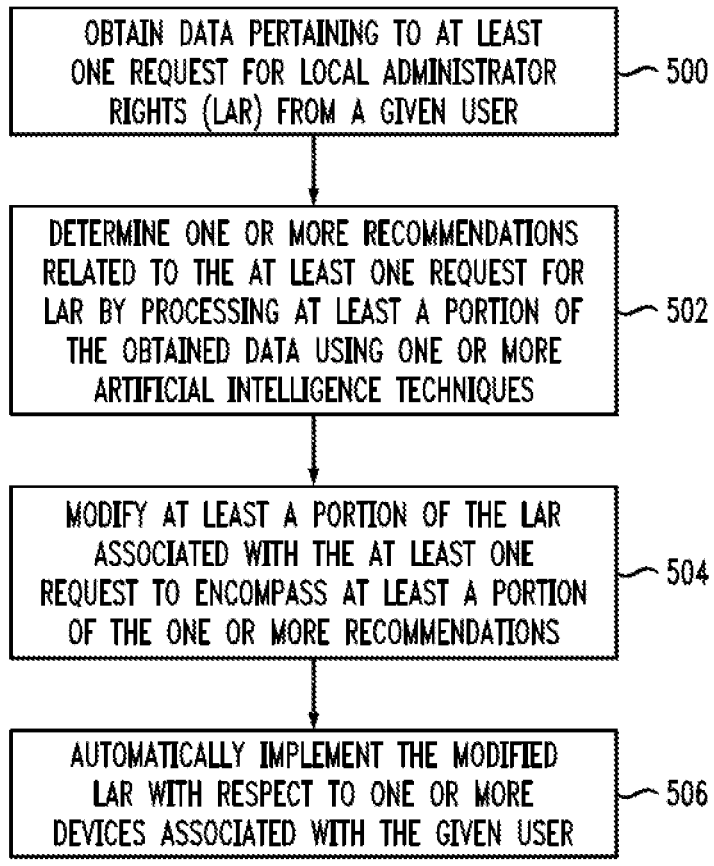

OBTAIN DATA PERTAINING TO AT LEAST ONE REQUEST FOR LOCAL ADMINISTRATOR RIGHTS (LAR) FROM A GIVEN USER ⟍ 500

DETERMINE ONE OR MORE RECOMMENDATIONS RELATED TO THE AT LEAST ONE REQUEST FOR LAR BY PROCESSING AT LEAST A PORTION OF THE OBTAINED DATA USING ONE OR MORE ARTIFICIAL INTELLIGENCE TECHNIQUES ⟍ 502

MODIFY AT LEAST A PORTION OF THE LAR ASSOCIATED WITH THE AT LEAST ONE REQUEST TO ENCOMPASS AT LEAST A PORTION OF THE ONE OR MORE RECOMMENDATIONS ⟍ 504

AUTOMATICALLY IMPLEMENT THE MODIFIED LAR WITH RESPECT TO ONE OR MORE DEVICES ASSOCIATED WITH THE GIVEN USER ⟍ 506

IMPLEMENTING USER-SPECIFIC LOCAL ADMINISTRATOR RIGHTS USING ARTIFICIAL INTELLIGENCE TECHNIQUES

COPYRIGHT NOTICE

BACKGROUND

Local administrator rights (LAR) are often required to perform certain activities within systems and/or networks. More particularly, providing LAR access typically grants permission for specified activities such as, e.g., installing programs, changing passwords, modifying network settings, altering system files, etc. However, granting LAR access can create security risks and compliance issues. For example, conventional LAR management approaches commonly include limited restrictions on downloading and/or installing software within the parameters of granted LAR access, which creates privilege-related risks to the corresponding devices, systems and/or networks from threat vectors such as, e.g., installation of unapproved software and/or malware, exposure to confidential and/or sensitive data, etc.

SUMMARY

Illustrative embodiments of the disclosure provide techniques for implementing user-specific LAR using artificial intelligence techniques.

An exemplary computer-implemented method includes obtaining data pertaining to at least one request for LAR from a given user, and determining one or more recommendations related to the at least one request for LAR by processing at least a portion of the obtained data using one or more artificial intelligence techniques. The method also includes modifying at least a portion of the LAR associated with the at least one request to encompass at least a portion of the one or more recommendations, and automatically implementing the modified LAR with respect to one or more devices associated with the given user.

Illustrative embodiments can provide significant advantages relative to conventional LAR management approaches. For example, problems associated with privilege-related risks such as, e.g., installation of unapproved software and/or malware, exposure to confidential and/or sensitive data, etc., are overcome in one or more embodiments through automatically modifying and implementing LAR for particular requesting users based on artificial intelligence-based analysis of LAR-related data.

These and other illustrative embodiments described herein include, without limitation, methods, apparatus, systems, and computer program products comprising processor-readable storage media.

BRIEF DESCRIPTION OF THE DRAWINGS

FIG. 2A, FIG. 2B, and FIG. 2C show examples of domain and/or persona dictionary-related tables in an illustrative embodiment.

FIG. 3A and FIG. 3B show example tables depicting user similarity with respect to software installed on corresponding devices in an illustrative embodiment.

FIG. 4 shows example pseudocode for determining similar users in connection with one or more LAR-related recommendations in an illustrative embodiment.

FIG. 5 is a flow diagram of a process for implementing user-specific LAR using artificial intelligence techniques in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
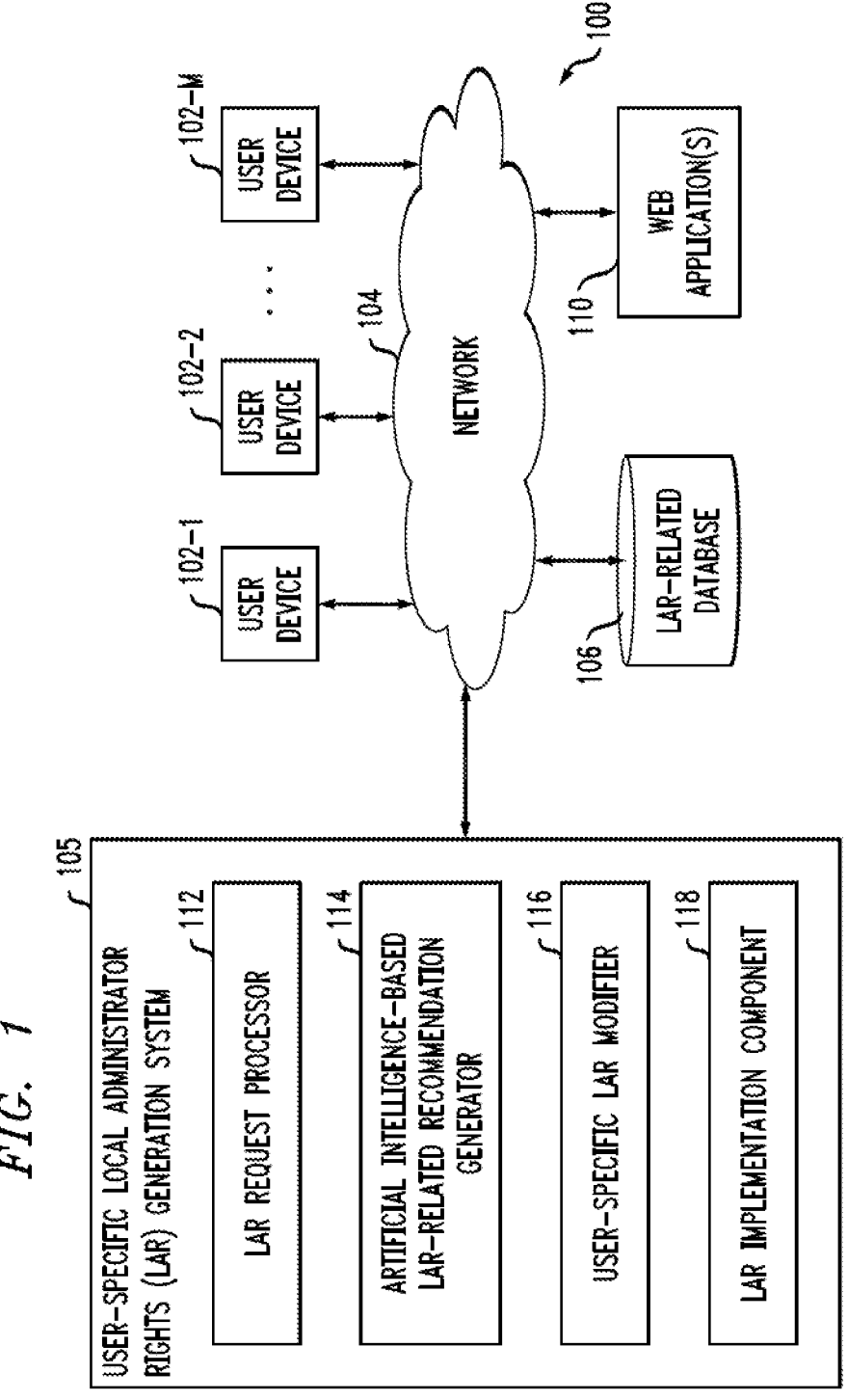
FIG. 1 shows an information processing system configured for implementing user-specific LAR using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is user-specific LAR generation system 105 and one or more web applications 110 (e.g., integrated development environment (IDE) applications, software libraries, software packages, etc.).

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the user-specific LAR generation system 105 can have an associated LAR-related database 106 configured to store data pertaining to software application usage, software library usage, and/or software package usage associated with various LAR access, various users, etc.

The LAR-related database 106 in the present embodiment is implemented using one or more storage systems associated with the user-specific LAR generation system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the user-specific LAR generation system 105 are one or more input-output devices, which illustratively comprise keyboards, displays or other types of input-output devices in any combination. Such input-output devices can be used, for example, to support one or more user interfaces to the user-specific LAR generation system 105, as well as to support communication between the user-specific LAR generation system 105 and other related systems and devices not explicitly shown.

Additionally, the user-specific LAR generation system 105 in the FIG. 1 embodiment is assumed to be implemented using at least one processing device. Each such processing device generally comprises at least one processor and an associated memory, and implements one or more functional modules for controlling certain features of user-specific LAR generation system 105.

More particularly, the user-specific LAR generation system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the user-specific LAR generation system 105 to communicate over the network 104 with the user devices 102, and illustratively comprises one or more conventional transceivers.

The user-specific LAR generation system 105 further comprises LAR request processor 112, artificial intelligence-based LAR-related recommendation generator 114, user-specific LAR modifier 116, and LAR implementation component 118.

It is to be appreciated that this particular arrangement of elements 112, 114, 116 and 118 illustrated in the user-specific LAR generation system 105 of the FIG. 1 embodiment is presented by way of example only, and alternative arrangements can be used in other embodiments. For example, the functionality associated with elements 112, 114, 116 and 118 in other embodiments can be combined into a single module, or separated across a larger number of modules. As another example, multiple distinct processors can be used to implement different ones of elements 112, 114, 116 and 118 or portions thereof.

At least portions of elements 112, 114, 116 and 118 may be implemented at least in part in the form of software that is stored in memory and executed by a processor.

It is to be understood that the particular set of elements shown in FIG. 1 for implementing user-specific LAR using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, two or more of user-specific LAR generation system 105, LAR-related database 106, and web application(s) 110 can be on and/or part of the same processing platform.

An exemplary process utilizing elements 112, 114, 116 and 118 of an example user-specific LAR generation system 105 in computer network 100 will be described in more detail with reference to the flow diagram of FIG. 5.

Accordingly, at least one embodiment includes implementing user-specific LAR using artificial intelligence techniques. Such an embodiment can include determining at least one type of application requested by a given user and/or likely to be used or needed by the given user, and generating and/or implementing application-specific LAR for the given user. By way merely of example, in accordance with such an embodiment, an IDE-specific LAR can be generated and/or implemented for a given user requested to use and/or predicted to use at least one IDE application, wherein the IDE-specific LAR cannot be utilized for any other types of actions or in connection with any other types of applications.

Also, one or more embodiments can include automatically, using one or more artificial intelligence techniques, determining one or more recommended actions for a given user, and generating and/or modifying corresponding user-specific LAR to incorporate the one or more recommended actions. Such an embodiment can include determining one or more libraries and/or software packages associated with a particular application to be used and/or requested by a given user in connection with specific LAR access, and modifying the LAR access to encompass and/or incorporate access to the one or more libraries and/or software packages, along with express recommendations and/or instructions pertaining thereto. As further detailed herein, determining such recommendations can include determining one or more relevant libraries and/or software packages which will be helpful in the given user's ability to make improved use of the particular application to be used and/or requested.

As used herein, a library in a web development context refers to a set of prewritten and reusable code and/or useful resources that developers can use to perform tasks, optimize tasks, add specific functionality, solve specific problems, etc. Additionally, in such contexts, packages refer to software bundles that include various components such as, for example, one or more libraries, one or more dependencies, one or more configuration files, etc. Such packages can be created to be distributed and installed, and an example package can include all necessary elements for a specific software to work properly. By way of example, for a web development project, recommended packages might include web frameworks, database connectors, and/or other dependencies needed for building and deploying a web application.

Additionally or alternatively, at least one embodiment can include generating and/or modifying user-specific LAR which restricts access to one or more specific applications such that the given user cannot download or install such applications despite potentially falling within the original scope and/or parameters of the LAR access. In such an embodiment, at least one artificial intelligence model can be trained, leveraging source attribute detection techniques, at least one domain and/or persona dictionary, and collaborative filtering techniques to identify and restrict specific applications based at least in part on attributes and historical usage patterns. Such a model can also organize and examine attributes of files associated with applications, create a list of approved software, libraries, and/or user data, identify individuals with similar software preferences and/or roles, recognize one or more patterns in past data regarding the software used by individuals, and distinguish between approved and unapproved applications. The model's accuracy can be determined, and the model can be implemented, e.g., to control software installations.

As further detailed herein, one or more embodiments include implementing at least a portion of the techniques described herein as a service, also referred to herein as LAR-as-a-Service (LAAS). Such an embodiment can include leveraging techniques detailed herein to group one or more libraries and/or one or more packages with software to be installed, along with one or more dependent items associated with the software, and incorporate such a grouping into LAR access privileges to be granted to a given user. As used herein, dependent items refer to software components, libraries, and/or packages that are required for the proper functioning of a specific application or software. Such an embodiment contrasts with conventional LAR management approaches, which provide no similar recommendations for libraries, packages, etc. that can be used to enhance use of the given software in question. Further, such conventional approaches typically require the user (after being granted static LAR access privileges) individually identifying and installing such libraries and/or packages, and such actions often also require additional and/or separate LAR access privileges, resulting in a tedious and resource-intensive process.

Accordingly, in connection with determining such recommendations, at least one embodiment includes performing source attribute detection in connection with a given LAR request. As used herein, in this context, a source refers to one or more files and/or one or more applications being analyzed for attributes (e.g., company name, file version, internal name, product name, etc.). In such an embodiment, source attribute detection includes extracting one or more source file attributes such as, e.g., enterprise name, file version, internal name, product name, original file name, product version, etc., using one or more command line utilities. As used herein, command line utilities refer to tools that execute through at least one command line interface (CLI) for one or more tasks. Further, one or more embodiments can include analyzing the extracted attributes to restrict one or more software downloads and/or installations other than software downloads and/or installations that are already approved under the LAR access privileges.

FIG. 2A, FIG. 2B, and FIG. 2C show examples of domain and/or persona dictionary-related tables in an illustrative embodiment. By way of illustration, FIG. 2A depicts table 200, which includes fields pertaining to information such as, for example, employee badge, classification, job title, job function, job family, job profile, region, country, business unit name and managers, wherein such data can provide details about users and their roles within a given organization. Such information can be important, for example, for user-based access control, understanding user roles, grouping users based on user attributes, etc.

Table 200 also includes fields pertaining to information such as, for example, product name, version, manufacturer, Microsoft software installer (MSI), software full name, release license, product license, compliance requirement, compliance item status and compliance tags status, wherein such data can provide details about the software applications used in the given organization. Such information can assist, for example, in managing and tracking software inventory, ensuring compliance with licenses, identifying unauthorized software, etc.

By way of illustration, FIG. 2B depicts table 220, which includes fields of host identifier (host_id) and software full name (cat_software_full_name), wherein such data indicates one or more relationships between hosts (e.g., computers and/or other devices) and installed software. Such information can be useful, for example, for tracking software installations on specific devices, helping to enforce policies related to software usage.

Further, by way of illustration, FIG. 2C depicts table 222, which includes fields such as software full name, various taxonomy categories, vendor categories (e.g., vendors categorized as not to be used), business unit name, job title, job function, job family, supervisory organization name, and work country code, wherein such information can provide additional categorization and organizational information. Also, table 222 can help, for example, in grouping software based on specific categories, business units, and/or user roles, which can be useful for more refined access control and policy enforcement.

One or more embodiments can include linking datasets such as depicted in FIG. 2A, FIG. 2B and/or FIG. 2C based on common attributes such as, for example, job title, business unit name, and software full name, wherein such linking can facilitate a more comprehensive understanding of which users (e.g., employees of a given organization) are associated with specific software applications and the compliance status associated therewith. Such an embodiment can also include implementing one or more access controls based at least in part on user roles and ensuring that software usage aligns with one or more compliance requirements. Further, by cross-referencing user information and software information, such an embodiment can include enhanced enforcement of policies regarding authorized software installations and compliance. Additionally, such an embodiment can include leveraging the information from such datasets and/or tables to identify users who have similar software usage patterns.

As further detailed herein, one or more embodiments include building and/or updating repositories which contain and/or consolidate data pertaining to one or more lists of approved software applications as well as one or more libraries and/or one or more packages associated therewith, and application usage data related thereto.

FIG. 3A and FIG. 3B show example tables depicting user similarity with respect to software installed on corresponding devices in an illustrative embodiment. By way of illustration FIG. 3A depicts table 300, which represents cosine similarity scores calculated across multiple software components using embeddings as inputs. In one or more embodiments, table 300 can contain embeddings that represent the semantic meaning of given libraries and packages. In such an embodiment, the combined vector representations can be used to identify associations between libraries and packages, and can also be used to discover one or more patterns in software usage.

Further, FIG. 3B depicts table 330, which includes fields pertaining to information such as ID (e.g., host ID), most similar ID, and similarity score, wherein such data can help, for example, refine one or more association rules by considering the strength of the connections between different software components.

FIG. 4 shows example pseudocode for determining similar users (e.g., employees) in connection with one or more LAR-related recommendations in an illustrative embodiment. In this embodiment, example pseudocode 400 is executed by or under the control of at least one processing system and/or device. For example, the example pseudocode 400 may be viewed as comprising a portion of a software implementation of at least part of user-specific LAR generation system 105 of the FIG. 1 embodiment.

The example pseudocode 400 illustrates importing the library, CountVectorizer, from the sklearn.feature_extraction.text module, and defining a custom_tokenizer to split text lines into tokens. As depicted in example pseudocode 400, CountVectorizer object can be initialized with binary=True (e.g., to represent the presence or absence of words in the text), and with tokenizer-custom_tokenizer (e.g., to keep track of how many times each word (e.g., software name) appears). As also depicted in example pseudocode 400, a vectorizer converts software names to at least one binary representation indicating whether the software is present or not.

Additionally, example pseudocode 400 illustrates creating a function referred to as "get_similar_emps" that identifies employees who have similar software preferences. In one or more embodiments, a similarity matrix can be used to determine these similarities. Further, example pseudocode 400 illustrates creating an empty list referred to as "sims" to store information about similar employees, including corresponding IDs, associated host IDs (e.g., device IDs), and similarity scores.

It is to be appreciated that this particular example pseudocode shows just one example implementation of determining similar users in connection with one or more LAR-related recommendations, and alternative implementations can be used in other embodiments.

At least one embodiment includes performing and/or implementing one or more collaborative filtering techniques. Such an embodiment can include creating combined vector representations of one or more libraries and one or more packages to identify and link with a given software application in question (e.g., a software application involved in a given instance of LAR for a particular user). As used herein, combined vector representations refer to vectors created by combining information from multiple sources and/or features to represent software entities such as libraries, packages, etc. Such vectors incorporate details from various sources, aspects and/or characteristics of the given software entities. For example, attributes such as company name, file version, internal name, product name, etc. can be treated as features, and vectors can be created by representing each software entity using such attributes.

At least one embodiment can also include creating one or more association rules to classify at least one given software application based at least in part on confidence values from past users and/or other historical data related to the given software application. By way merely of example, if a team member is installing an IDE on a corresponding machine for .NET application development, the team member can be recommended to install .NET framework libraries. Such an association has been determined because .NET framework libraries are often installed with IDE in historical records of the team. Accordingly, at least one association rule can be discovered and/or learned from historical data by analyzing patterns of library usage and corresponding application types.

Further, one or more embodiments include identifying commonly used approved libraries and/or packages, used in association with at least one given software application, across at least a group of users (e.g., a given enterprise team, a group of users determined to share one or more similarities, etc.). Identifying such commonly used approved libraries and/or packages can include gathering historical data on library and/or package installations and usage patterns, extracting attributes (e.g., company name, file version, etc.) therefrom using one or more command line utilities, and building one or more repositories consolidating approved software, libraries, packages, workday, etc. Additionally, at least one embodiment can include utilizing one or more collaborative filtering algorithms and association rule mining techniques to discern usage patterns and relationships in library and/or package installations. Further, such an embodiment can include generating vector representations for libraries and/or packages, facilitating similarity analysis, imposing one or more rules on user devices based at least in part on identified patterns, and validating to restrict unauthorized activities.

Additionally, such an embodiment can include determining and/or generating rules associated with at least a portion of the identified commonly used approved libraries and/or packages, and implementing and/or imposing such rules on one or more devices of at least one given user (e.g., a user requesting and/or utilizing LAR access encompassing the at least one given software application). Such rules, executing on the one or more devices, can effectively modify the LAR access to validate user activity with respect to the identified commonly used approved libraries and/or packages and/or restrict user activity with respect to one or more libraries and/or packages not included in the identified list.

Accordingly, at least one embodiment includes using one or more artificial intelligence techniques to process data pertaining to a given application and one or more recommended related actions for application-specific and/or user-specific LAR suitability (e.g., printer-specific LAR, IDE-specific LAR., command line-specific LAR, etc.). Such an embodiment can include using at least one neural network-based matching engine to associate an LAR request with one or more specific applications. For example, LAR for an IDE application cannot be utilized for installing other unrelated applications and/or activity.

By way merely of illustration, consider an example use case wherein a user submits a request for LAR, specifying the need for an IDE installation. In such a scenario, a neural network-based matching engine, such as detailed above, can process the request, focusing on the application name and description provided. In at least one embodiment, the neural network-based matching engine uses at least one pre-trained (trained on a diverse set of textual data related to software development, software inventory, programming tools, etc.) transformer model such as, e.g., one or more bidirectional encoder representations from transformers (BERT) models to generate contextual word embeddings for the words in the request. Such actions can help, for example, to capture the meanings of the words in their specific contexts.

Additionally, such an embodiment can include using one or more fuzzy string matching metrics (e.g., Levenshtein distance) to evaluate the similarity between the application name and one or more other possible variations and/or descriptions. Further, at least one embodiment can include performing a search to explore and/or determine various representations, spellings, and/or descriptions of a given application (e.g., an IDE). Accordingly, such an embodiment can include matching a user request with one or more known attributes of a given application (e.g., an IDE) and assigning a corresponding LAR request to the given application if there is a sufficient level of similarity. The approved application for LAR can then be validated and authorized for the installation, while access to one or more other applications can be restricted.

By way merely of illustration, consider an example LAR request text of "Requesting LAR for IDE installation" processed by tokenization in accordance with one or more embodiments. In such an embodiment, at least a portion of the request text is split into tokens such as ["Requesting," "LAR," "for," "IDE," and "installation." ]. The tokens are then converted into contextualized word embeddings using a pre-trained BERT model. The BERT embeddings, by way merely of example, can be generated as follows: an embedding for "Requesting" includes [0.12, –0.45, 0.78, . . . ]; an embedding for "LAR" includes [0.65, 0.32, –0.21, . . . ]; and an embedding for "IDE" includes [0.88, –0.15, 0.42, . . . ].

Additionally, at least one embodiment includes measuring the similarity between the LAR request embeddings and embeddings of known IDE-related terms, wherein fuzzy string matching techniques can be used to calculate the similarity score(s). Further, an ultimate decision, pertaining to the LAR request, can be made based at least in part on the similarity score(s) and one or more threshold values.

Accordingly, one or more embodiments include utilizing one or more pre-trained transformer language models (e.g., one or more BERT models) to obtain and/or generate contextual word embeddings which can be used in connection with approximate semantic name matching processes. Such a process can be paired, for example, with one or more fuzzy string matching distances metrics such as, e.g., Levenshtein distance, etc., in connection with implementing at least one search mechanism. Such a mechanism can be used, for example, to associate and/or monitor if an approved application is being utilized in connection with a given LAR and/or a given user.

As such, one or more embodiments include preventing unauthorized software downloads and/or installations in connection with LAR privileges. Such an embodiment can also include improving productivity by facilitating similar users (e.g., team members) to download and/or install specific software applications and/or related libraries and packages. Additionally, such an embodiment includes implementing granular control over the modification and/or elevation of LAR privileges.

It is to be appreciated that some embodiments described herein utilize one or more artificial intelligence models. It is to be appreciated that the term "model," as used herein, is intended to be broadly construed and may comprise, for example, a set of executable instructions for generating computer-implemented recommendations and/or predictions. For example, one or more of the models described herein may be trained to generate recommendations and/or predictions based on historical usage data from various users, user devices, and/or applications, and such recommendations and/or predictions can be used to initiate one or more automated actions (e.g., automatically modifying existing LAR, automatically implementing such modified LAR with respect to one or more devices associated with a requesting user, automatically training and/or fine-tuning artificial intelligence techniques, etc.).

FIG. 5 is a flow diagram of a process for implementing user-specific LAR using artificial intelligence techniques in an illustrative embodiment. It is to be understood that this particular process is only an example, and additional or alternative processes can be carried out in other embodiments.

In this embodiment, the process includes steps 500 through 506. These steps are assumed to be performed by the user-specific LAR generation system 105 utilizing elements 112, 114, 116 and 118.

Step 500 includes obtaining data pertaining to at least one request for LAR from a given user. In at least one embodiment, obtaining data pertaining to the at least one request for LAR includes performing source attribute detection in connection with the at least one request for LAR. In such an embodiment, performing source attribute detection can include determining, by processing at least a portion of the obtained data pertaining to the at least one request for LAR using one or more command line utilities, one or more source attributes comprising at least one of enterprise name associated with the at least one request for LAR, file version associated with the at least one request for LAR, identifying information associated with the given user, product name associated with the at least one request for LAR, and product version associated with the at least one request for LAR.

Step 502 includes determining one or more recommendations related to the at least one request for LAR by processing at least a portion of the obtained data using one or more artificial intelligence techniques. In one or more embodiments, determining one or more recommendations includes processing the at least a portion of the obtained data using at least one neural network-based matching engine to associate the at least one request for LAR with one or more software applications. In such an embodiment, processing the at least a portion of the obtained data using at least one neural network-based matching engine can include processing the at least a portion of the obtained data using one or more pre-trained BERT models to generate contextual word embeddings to be used in connection with one or more approximate semantic name matching processes. Further, in such an embodiment, using the one or more contextual word embeddings in connection with one or more approximate semantic name matching processes can include utilizing one or more fuzzy string matching distances metrics in connection with implementing at least one search mechanism to monitor whether the one or more software applications are utilized in connection with LAR related to the LAR associated with the at least one request.

Additionally or alternatively, in one or more embodiments, determining one or more recommendations includes identifying at least one of one or more software libraries and one or more software packages, associated with the LAR associated with the at least one request, which can be implemented to enhance productivity of the given user in connection with the LAR. In such an embodiment, identifying at least one of one or more software libraries and one or more software packages can include performing one or more collaborative filtering techniques comprising creating combined vector representations of at least one of multiple software libraries and multiple software packages with respect to one or more software applications associated with the LAR. Additionally or alternatively, identifying at least one of one or more software libraries and one or more software packages can include identifying at least one of one or more approved software libraries and one or more approved packages used by one or more users, sharing one or more similarities with the given user, in association with at least one of one or more software applications associated with the LAR.

Step 504 includes modifying at least a portion of the LAR associated with the at least one request to encompass at least a portion of the one or more recommendations. In at least one embodiment, modifying at least a portion of the LAR includes incorporating one or more instructions pertaining to the at least a portion of the one or more recommendations. Additionally or alternatively, modifying at least a portion of the LAR can include restricting access, based at least in part on the at least a portion of the one or more recommendations, to one or more software applications within an original scope of the LAR.

Step 506 includes automatically implementing the modified LAR with respect to one or more devices associated with the given user. Additionally, the techniques depicted in FIG. 5 can also include performing one or more automated actions based at least in part on feedback related to the automatic implementation of the modified LAR. In such an embodiment, performing one or more automated actions can include automatically training at least a portion of the one or more artificial intelligence techniques using one or more portions of the feedback.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to implement user-specific LAR using artificial intelligence techniques. These and other embodiments can effectively overcome problems associated with privilege-related risks such as, e.g., installation of unapproved software and/or malware, exposure to confidential and/or sensitive data, etc.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figures 6, 7:
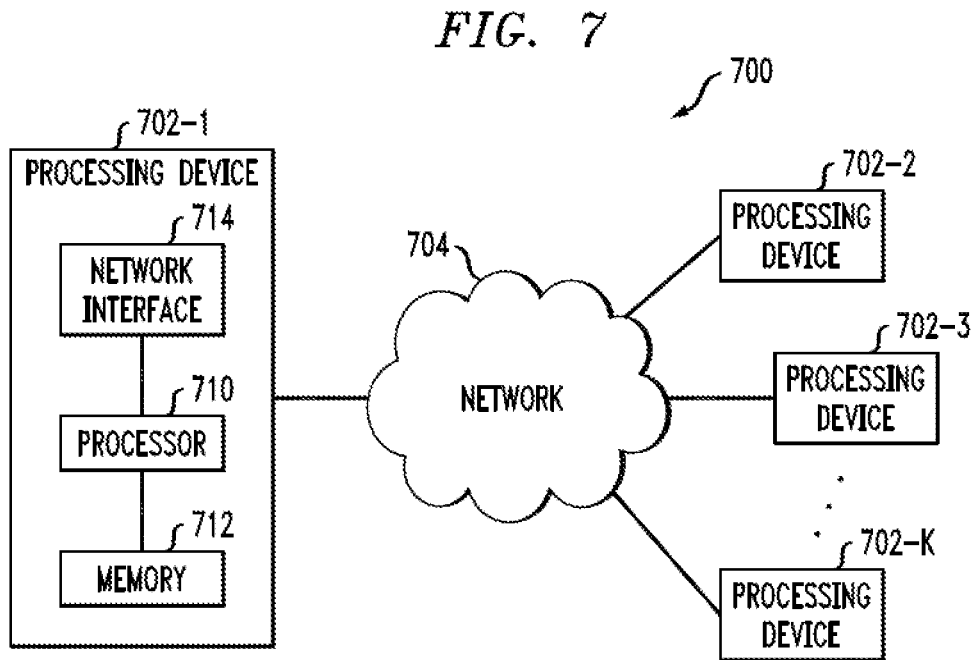
FIGS. 6 and 7 show examples of processing platforms that may be utilized to implement at least a portion of an information processing system in illustrative embodiments.

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, wherein the hypervisor platform has an associated virtual infrastructure management system. The underlying physical machines comprise one or more information processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a CPU, a GPU, a TPU, a microcontroller, an ASIC, a FPGA or other type of processing circuitry, as well as portions or combinations of such circuitry elements.

The memory 712 comprises random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining data pertaining to at least one request for local administrator rights (LAR) from a given user;
determining one or more recommendations related to the at least one request for LAR by processing at least a portion of the obtained data using one or more artificial intelligence techniques, wherein determining the one or more recommendations comprises identifying at least one of one or more software libraries and one or more software packages, related to the LAR associated with the at least one request, to be implemented in connection with the LAR;
modifying at least a portion of the LAR associated with the at least one request to encompass at least a portion of the one or more recommendations; and
automatically implementing the modified LAR with respect to one or more devices associated with the given user;
wherein the method is performed by at least one processing device comprising a processor coupled to a memory.

2. The computer-implemented method of claim 1, wherein determining the one or more recommendations comprises processing the at least a portion of the obtained data using at least one neural network-based matching engine to associate the at least one request for LAR with one or more software applications.

3. The computer-implemented method of claim 2, wherein processing the at least a portion of the obtained data using at least one neural network-based matching engine comprises processing the at least a portion of the obtained data using one or more pre-trained bidirectional encoder representations from transformers (BERT) models to generate contextual word embeddings to be used in connection with one or more approximate semantic name matching processes.

4. The computer-implemented method of claim 3, wherein using the contextual word embeddings in connection with one or more approximate semantic name matching processes comprises utilizing one or more fuzzy string matching distances metrics in connection with implementing at least one search mechanism to monitor whether the one or more software applications are utilized in connection with LAR related to the LAR associated with the at least one request.

5. The computer-implemented method of claim 1, wherein modifying the at least a portion of the LAR comprises incorporating one or more instructions pertaining to the at least a portion of the one or more recommendations.

6. The computer-implemented method of claim 1, wherein modifying the at least a portion of the LAR comprises restricting access, based at least in part on the at least a portion of the one or more recommendations, to one or more software applications within an original scope of the LAR.

7. The computer-implemented method of claim 1, wherein identifying the at least one of one or more software libraries and one or more software packages comprises performing one or more collaborative filtering techniques comprising creating combined vector representations of at least one of multiple software libraries and multiple software packages with respect to one or more software applications associated with the LAR.

8. The computer-implemented method of claim 1, wherein identifying the at least one of one or more software libraries and one or more software packages comprises identifying at least one of one or more approved software libraries and one or more approved packages used by one or more users, sharing one or more similarities with the given user, in association with at least one of one or more software applications associated with the LAR.

9. The computer-implemented method of claim 1, wherein obtaining the data pertaining to the at least one request for LAR comprises performing source attribute detection in connection with the at least one request for LAR.

10. The computer-implemented method of claim 9, wherein performing the source attribute detection comprises determining, by processing at least a portion of the obtained data pertaining to the at least one request for LAR using one or more command line utilities, one or more source attributes comprising at least one of enterprise name associated with the at least one request for LAR, file version associated with the at least one request for LAR, identifying information associated with the given user, product name associated with the at least one request for LAR, and product version associated with the at least one request for LAR.

11. The computer-implemented method of claim 1, further comprising:
performing one or more automated actions based at least in part on feedback related to the automatic implementation of the modified LAR.

12. The computer-implemented method of claim 11, wherein performing the one or more automated actions comprises automatically training at least a portion of the one or more artificial intelligence techniques using one or more portions of the feedback.

13. A non-transitory processor-readable storage medium having stored therein program code of one or more software programs, wherein the program code when executed by at least one processing device causes the at least one processing device:
to obtain data pertaining to at least one request for local administrator rights (LAR) from a given user;
to determine one or more recommendations related to the at least one request for LAR by processing at least a portion of the obtained data using one or more artificial intelligence techniques, wherein determining the one or more recommendations comprises identifying at least one of one or more software libraries and one or more software packages, related to the LAR associated with the at least one request, to be implemented in connection with the LAR;
to modify at least a portion of the LAR associated with the at least one request to encompass at least a portion of the one or more recommendations; and
to automatically implement the modified LAR with respect to one or more devices associated with the given user.

14. The non-transitory processor-readable storage medium of claim 13, wherein determining the one or more recommendations comprises processing the at least a portion of the obtained data using at least one neural network-based matching engine to associate the at least one request for LAR with one or more software applications.

15. The non-transitory processor-readable storage medium of claim 14, wherein processing the at least a portion of the obtained data using at least one neural network-based matching engine comprises processing the at least a portion of the obtained data using one or more pre-trained bidirectional encoder representations from transformers (BERT) models to generate contextual word embeddings to be used in connection with one or more approximate semantic name matching processes.

16. The non-transitory processor-readable storage medium of claim 13, wherein modifying the at least a portion of the LAR comprises incorporating one or more instructions pertaining to the at least a portion of the one or more recommendations.

17. An apparatus comprising:
at least one processing device comprising a processor coupled to a memory;
the at least one processing device being configured:
to obtain data pertaining to at least one request for local administrator rights (LAR) from a given user;
to determine one or more recommendations related to the at least one request for LAR by processing at least a portion of the obtained data using one or more artificial intelligence techniques, wherein determining the one or more recommendations comprises identifying at least one of one or more software libraries and one or more software packages, related to the LAR associated with the at least one request, to be implemented in connection with the LAR;
to modify at least a portion of the LAR associated with the at least one request to encompass at least a portion of the one or more recommendations; and
to automatically implement the modified LAR with respect to one or more devices associated with the given user.

18. The apparatus of claim 17, wherein determining the one or more recommendations comprises processing the at least a portion of the obtained data using at least one neural network-based matching engine to associate the at least one request for LAR with one or more software applications.

19. The apparatus of claim 18, wherein processing the at least a portion of the obtained data using at least one neural network-based matching engine comprises processing the at least a portion of the obtained data using one or more pre-trained bidirectional encoder representations from transformers (BERT) models to generate contextual word embeddings to be used in connection with one or more approximate semantic name matching processes.

20. The apparatus of claim 17, wherein modifying the at least a portion of the LAR comprises restricting access, based at least in part on the at least a portion of the one or more recommendations, to one or more software applications within an original scope of the LAR.

* * * * *